United States Patent Office 2,719,091
Patented Sept. 27, 1955

2,719,091

WATER INSOLUBLE PAINT COMPOSITIONS

Arthur S. Wendt, West Englewood, N. J., assignor to Fred Fear & Co., Brooklyn, N. Y., a corporation of New York No Drawing. Application October 26, 1951,
Serial No. 253,446

14 Claims. (Cl. 106—239)

This invention relates to water-insoluble coloring and painting compositions having density lower than that of water and in particular is concerned with a non-toxic paint composition of a durability suitable for use on childrens' toys, yet of such low toxicity so that it may be classed as an edible material.

Regularly, when seasonal gift-buying becomes a family activity, organizations which cater to the trade in supplying childrens' toys paints to be used by children caution the conscientious parent to select only such objects as will be painted with non-toxic material. They are requested to remain aware of the fact that the normal childish tendency is to chew on any object or container approximately small enough to permit insertion of any portion of it into the mouth, so that should the paint be of a toxic variety, the accumulation of a portion of it in the child's system can lead to difficulties and, even tragic results. In general, some form of seal of approval of parents' organizations will appear on articles which are safe from the mechanical or electrical standpoint, but there appears to be little emphasis on the hazard involved in using conventional pigmented paints on toys.

In the past, coloring compositions, particularly those used for coloring Easter eggs, have been of a number of types, including solid pellets which are dispersible on the surface of water standing in a dipping container, such as a pan. Liquid Easter egg colors, up to the present time, have utilized petroleum fractions, mineral spirits and turpentine which are inflammable, toxic, unpleasant and unsatisfactory in handling. Such liquids containing ingredients of this type are dangerous for use by children and often contain paint or colored varnish, or both. The mere marketing of this type of composition in liquid form, available in bottles to small children, has been previously considered hazardous for these reasons.

The present invention provides a single or multi-color liquid composition which forms on a body of water at the proper temperature, and is therefore useful in dipping toys, eggs, and other juvenile appurtenances. This composition is dispersible on water at normal, as well as elevated temperatures. I have found that the paint material described herein is exceedingly useful when dispersed on a water surface and that when more than one color is used, variegated effects may be obtained exhibiting unusual characteristics. It has also been found that this composition is more easily removed from a pan, particularly enameled pans, after use in the home, than compositions incorporating the usual paints and varnishes. This material is easily removed from the fingers and does not have the disadvantages of prior water-insoluble compositions described above.

It is accordingly a fundamental object of the instant invention to provide inexpensive, durable, colorful paints for application to childrens' toys, Easter eggs, models, rubber balloons, and the like, which paints will be non-toxic if ingested.

It is a second object of the invention to provide a paint composition which will be non-toxic if consumed, even in substantial quantity, direct from its container.

Other objects and advantages of the invention will in part be obvious and in part appear hereinafter.

The invention, accordingly, is embodied in a composition which is characterized by being non-toxic, edible and composed of a pigment, resinous film forming-material and oil which, when applied to surfaces, such, for example as conventional toy, game and novelty surfaces, will leave behind a durable film containing non-toxic ingredients.

In its broadest aspects, the invention is embodied in a paint pigment composition containing as a pigment an aluminum lake of a certified color in an amount from 1 to 20 percent by weight, preferably from about 3 to about 10 percent, which is incorporated into a medium comprising non-toxic resin in an amount from 5 percent to about 60 percent, preferably between 35 and 55 percent, employing as a solvent an edible essential oil of the flavoring oil variety, such as mint oils or fractions thereof for example, peppermint and spearmint oils or fractions, or citrus fruit oils or fractions thereof such as orange, lemon, lime and grapefruit in an amount from about 30 to 90 percent, and preferably between 40 to 60 percent.

I have found that when this group of ingredients is combined in substantially the proportions outlined, there is produced a paint of a useful consistency which is relatively stable against settling of the pigment and which, when applied to a surface, will dry out in a reasonable period of time, but leave behind a film as heavily pigmented as the formula indicates, the film being quite durable and resistant to the abuse to which childrens' toys will generally be subjected, in addition to being floatable on a water surface by reason of the density of the material being less than that of water. As specific examples of the formulation, the following are cited.

*Example 1.*—Fifteen parts of an aluminum lake of F. D. and C. Blue No. 1 is ground into a paste formed of 35 parts of a purified rosin blended with about 20 parts of a distilled orange oil. When thorough distribution of the pigment in the paste had been brought about through grinding, the mixture was diluted with an additional 30 parts of orange oil to form the final paint. The paint formulation was tested for its durability by painting a number of samples of typical childrens' toys, principally those of the pull variety, which were compared with similar toys painted with ordinary paints formed of pigment, oil and petroleum fraction. No material difference in durability of the two products was noted after several weeks of use of the toys painted with the two types of paint, thereby indicating that the edible paint of the instant formulation was substantially as durable for the intended purpose as conventional paints.

*Example 2.*—A similar formulation of yellow paint is formed by combining 10 parts of a yellow aluminum lake of F. D. and C. Yellow No. 5 with 50 parts of coumarone-indene resin and 20 parts of grapefruit oil. The paste thereby formed by grinding these together is diluted up to a final desired volume by incorporating an additional 20 parts of grapefruit oil.

Durability tests as compared with conventional paints indicated the above formulation was at least as durable and had the virtue of being completely non-toxic and to some extent, mildly palatable.

*Example 3.*—A third formulation, representing a typical red is made up of 5 parts of a red lake identified as F. D. and C. Red, No. 3, which is ground into a paste formed of 45 parts of glyceryl ester of hydrogenated rosin with 20 parts of lemon oil and the paint made up to the desired end volume by adding 30 parts of lemon oil. Durability and toxicity tests indicated the paint was quite serviceable and non-toxic.

In general, it may be stated that for variations of colors, different primary pigments may be combined or blended and the resins employed may also be blended with each other, as well as mixtures of the several recommended oils may be employed. Thus in Example 1, the resin may be a mixture of rosin and the glyceryl ester of rosin and the oil used may be a mixture of two or more of those named.

In lieu of rosin, or in combination therewith, certain non-toxic resins may be used which are compatible with the other ingredients in the paint composition of the present invention. Among these resins are pentaerithrytyl tetraabietate, ester gums, hydrogenated rosins and glyceryl or other esters thereof, dammar gum, coumarone-indene resins, terpene resins, and alkyd resins, any of which non-toxic resins may be used. Examples of F. D. and C. colors and their respective color indices or chemical composition are as follows:

| FD & C No. | Color Index or Composition |
| --- | --- |
| Blue #1 | Disodium salt of 4-([4-(N-ethyl-p-sulfobenzyl-amino)-phenyl]-(2-sulfoniumphenyl)-methylene)-[1-N-ethyl-N-p-sulfobenzyl)-Δ²,⁵-cyclohexadienimine]. |
| Yellow #5 | 640. |
| Red #3 | 773. |
| Green #3 | Disodium salt of 4-([4-(N-ethyl-p-sulfobenzyl-amino)-phenyl-(4-hydroxy-2-sulfoniumphenyl)-methylene]-[1-N-ethyl-(N-p-sulfobenzyl)-Δ²,⁵-cyclohexadienimine]. |
| Red #1 | 80. |
| Yellow #6 | Disodium Salt of 1-p-sulfophenylazo-2-naphthol-6-sulfonic acid. |
| Blue #2 | 1180. |
| Green #1 | 666. |
| Red #2 | 184. |
| Yellow #1 | 10. |
| Orange #1 | 150. |
| Green #2 | 670. |

Variations of a formulation to develop paints having similar properties of durability and non-toxicity are developed as follows:

*Example 4*

3 parts of F. D. and C. Yellow No. 5 aluminum lake
37 parts of a film forming resin formed of equal parts of purified rosin and glyceryl esters of hydrogenated rosin
60 parts of an equal mixture of lime and grapefruit oil

*Example 5*

20 parts F. D. and C. Blue No. 1 aluminum lake
60 parts of resin consisting of an equal mixture of coumarone-indene resin and purified rosin
20 parts of an equal mixture of orange and lemon oil

*Example 6*

7 parts pigment F. D. and C. Red No. 3 aluminum lake
43 parts of a resin with an equal mixture of coumarone-indene and glyceryl ester of hydrogenated resin
50 parts of a mixture of lemon and lime oils It will be apparent from the above detailed description that I have devised a paint formula which, when applied to a surface, will leave behind a durable protective film useful as a paint protection on an object, which paint has the virtue of being completely non-toxic and even mildly palatable so that tragic errors which can occur in the home through the inadvertent consumption of paint on toys by a child are avoided. Also, working conditions are improved in the manufacturing plant where this product is made, wherein the workers may operate in a pleasant and fragrant atmosphere rather than in the presence of noxious or unpleasant fumes.

Having described my invention and illustrated it with only a limited number of examples, it is to be understood that variations in the composition may be made without departing from the spirit or scope of the invention is herein set forth.

What is claimed is:

1. A water-insoluble paint composition characterized by its non-toxicity and is dispersibility on a water surface, comprising an aluminum lake food color incorporated in a film forming medium formed from non-toxic resin selected from the group consisting of purified rosin, hydrogenated rosins and esters thereof, dammar gum, ester gums, coumarone-indene resins, terpene resins, pentaerythrityl tetra-abietate, alkyd resins and mixtures thereof, and edible essential oil selected from the group consisting of mint oil and citrus oil and fractions thereof and mixtures thereof and of said fractions.

2. The paint composition of claim 1 in which the lake food color is present in the proportion from about 1% to about 20% by weight, the resin is present in the proportion from about 5% to about 60% by weight and the essential oil is present in the proportion from about 30% to about 90% by weight.

3. The paint composition of claim 1 in which the lake food color is present in the proportion from about 3% to about 10% by weight, the resin is present in the proportion from about 35% to about 55% by weight, and the essential oil is present in the proportion from about 40% to about 60% by weight.

4. A water-insoluble paint composition characterized by its dispersibility on a water surface comprising an aluminum lake food color incorporated in a film forming medium formed from a rosin and a citrus oil.

5. A water-insoluble paint composition characterized by its dispersibility on a water surface comprising an aluminum lake food color incorporated in a film forming medium formed from an ester gum and a citrus oil.

6. A water-insoluble paint composition characterized by its dispersibility on a water surface comprising an aluminum lake food color incorporated in a film forming medium formed from a dammar gum and a citrus oil.

7. A water-insoluble paint composition characterized by its dispersibility on a water surface comprising an aluminum lake food color incorporated in a film forming medium formed from pentaerythrityl tetra-abietate and a citrus oil.

8. A water-insoluble paint composition characterized by its dispersibility on a water surface comprising an aluminum lake food color incorporated in a film forming medium formed from a terpene resin and a mint oil.

9. A water-insoluble paint composition in accordance with claim 1 in which the food color lake is an aluminum lake.

10. A paint in accordance with claim 1 in which the solvent is an essential oil from a citrus fruit.

11. A paint composition in accordance with claim 14, in which the edible essential oil is selected from the group consisting of distilled orange, lemon, lime, grapefruit, mint oils and mixtures and fractions thereof.

12. A water-insoluble paint composition in accordance with claim 1 and characterized by its density lower than that of water and its dispersibility on a water surface and its durability when in a dry film and its non-toxicity comprising, a food color lake incorporated in a film forming medium formed from a non-toxic resin and a solvent for said resin, said solvent being selected from the group consisting of distilled orange, lemon, lime, grapefruit, mint oils and mixtures and fractions thereof.

13. A water-insoluble paint composition in accordance with claim 1 and characterized by its density lower than that of water and its dispersibility on a water surface and its durability when in a dry film and its non-toxicity comprising, a food color lake incorporated in a film forming medium formed from a non-toxic resin selected from the group consisting of purified rosin, hydrogenated rosins and esters thereof, dammar gum, ester gums, coumarone-indene resins, terpene resins, pentaerythrityl tetra-abietate, alkyd resins and mixtures thereof, and an edible essential oil which is a solvent for said resin.

14. A water-insoluble paint composition characterized by its density lower than that of water and its dispersibility on a water surface and its durability when in a dry film and its non-toxicity comprising, a food color lake incorporated in a film forming medium formed from a non-toxic resin selected from the group consisting of purified rosin, hydrogenated rosins and esters thereof, dammar gum, ester gums, coumarone-indene resins, terpene resins, pentaerythrityl tetra-abietate, alkyd resins and mixtures thereof, and an edible essential oil selected from the group consisting of orange, lemon, lime, grapefruit, mint oils and mixtures and fractions of said oils.

References Cited in the file of this patent

UNITED STATES PATENTS

| | | |
|---|---|---|
| 380,654 | Lefferts | Apr. 3, 1888 |
| 990,261 | Healy | Apr. 25, 1911 |
| 1,164,036 | Turkin | Dec. 14, 1915 |
| 1,918,804 | Gardner | July 18, 1933 |
| 2,379,070 | Evans et al. | June 26, 1945 |

FOREIGN PATENTS

| | | |
|---|---|---|
| 168,174 | Great Britain | Sept. 1, 1921 |